United States Patent
Wu et al.

(10) Patent No.: US 7,643,432 B2
(45) Date of Patent: Jan. 5, 2010

(54) METHOD FOR ANALYZING A NETWORK ENVIRONMENT

(75) Inventors: Jen-Chih Wu, Taoyuan (TW); Sheng-Fu Cheng, Taipei (TW); Jung-Jen Lee, Banciao (TW); Nai-Wen Huang, Bade (TW); Shih-Wu Fan-Jiang, Pingjhen (TW); Yen-Chun Liao, Taichung (TW)

(73) Assignee: Vivotek Inc., Taipei County (TW)

( * ) Notice: Subject to any disclaimer, the term of this patent is extended or adjusted under 35 U.S.C. 154(b) by 86 days.

(21) Appl. No.: 12/054,737

(22) Filed: Mar. 25, 2008

(65) Prior Publication Data

US 2008/0285484 A1 Nov. 20, 2008

(30) Foreign Application Priority Data

May 14, 2007 (TW) .............................. 96116983 A (51) Int. Cl.
*G01R 31/08* (2006.01)
*G06F 11/00* (2006.01)
*H04L 12/28* (2006.01)

(52) U.S. Cl. ...................................... 370/252; 370/254
(58) Field of Classification Search ....................... None
See application file for complete search history.

(56) References Cited

U.S. PATENT DOCUMENTS

| 6,958,996 | B2 * | 10/2005 | Xiong | 370/389 |
| 2003/0126248 | A1 * | 7/2003 | Chambers | 709/223 |
| 2006/0129677 | A1 * | 6/2006 | Tamura | 709/227 |

* cited by examiner

*Primary Examiner*—Chirag G Shah
*Assistant Examiner*—Ashley L Shivers
(74) *Attorney, Agent, or Firm*—Rabin & Berdo, P.C.

(57) ABSTRACT

A method for analyzing a network environment, is provided. First acquiring a plurality of connection data of all network cards of a terminal device is performed. Then, according to connection data, determining whether or not a terminal device uses a PPPoE connection to connect to a network system. Finally, determining whether or not an IP address of the terminal device is a public IP address and determining whether or not the terminal device uses DHCP to acquire a target IP address.

21 Claims, 10 Drawing Sheets

METHOD FOR ANALYZING A NETWORK ENVIRONMENT

BACKGROUND OF THE INVENTION (a) Field of the Invention

The present invention relates to a method for analyzing a network environment and setting up of a network device, and more particularly relates to a method which analyzes a network configuration of a terminal device to determine the corresponding network structure.

(b) Description of the Prior Art

Currently, the use of network cameras is becoming increasingly widespread, which has led to network cameras gradually becoming part of our daily life, and more and more users are using network cameras. However, the first step for the user to use a network camera is installing the network camera. Typical hardware infrastructure for installing a network camera involves coupling the network camera to a sharing device, and coupling the sharing device to a personal computer. Under the installation procedure of the prior art, the user needs to have a thorough understanding of the corresponding network environment to complete the process. In general, network environments can be separated into four types: direct dial-up network access (public IP address), direct fixed connection network access (fixed public IP address), using a sharing device to access the network (floating LAN IP address) and use a sharing device to access the network (fixed LAN IP address). The user must accurately set up the network parameters of the network camera according to the network environment where the camera is located to enable the network function to be operated normally. If the network camera is installed to a sharing device or other device provided with Network Address Transfer (NAT) functionality, then, after installation, the user must also open the corresponding connection ports of the NAT device to enable a client to connect and access the network camera from the external networks.

However, unfortunately, the general user usually does not have the adequate background knowledge of networks. Hence, for the general user, setting up network parameters is an extremely distressing process, because the general user is not aware of what network structure is before him. Thus, when there is a need to install a network camera, especially when it is required that a user can remotely connect to the network camera via an internal network or external network, then the user needs to face succession of complicated network settings, which frequently makes the user feel quite helpless.

In the prior art, since the installation procedure is unable to automatically identify the network environment and complete the setting up of the network camera, the setting procedure becomes too excessively complicated for the general user who does not have the background knowledge on networks to set up the system by himself.

SUMMARY OF THE INVENTION

In light of the above, an objective of the present invention is to provide a method for analyzing a network environment, which uses a terminal device to execute a software program, and after the software program has analyzed the network structure, then the network device is automatically set up, thereby completing the installation procedure without the need for the user to carry out complicated procedures to set up the network.

In order to achieve the aforementioned and other objectives, the present invention proposes the method for analyzing a network environment, which is suitable for installation in a network device, wherein a typical network infrastructure of the method of the present invention comprises a data set, a terminal device, a network device and a sharing device. The data set is coupled with a network system, and the terminal device is provided with a target IP address, while the sharing device is coupled to the data set, the terminal device and the network device respectively.

The method of the present invention comprises the following steps:

(1) Executing a first analysis procedure by the terminal device, to determine whether or not a Point to Point Protocol over Ethernet (PPPoE) connection is used to connect to a network;

(2) Executing a second analysis procedure by the terminal device, to determine whether or not a IP address is a public IP address; and (3) Executing a third analysis procedure by the terminal device, to determine whether or not the terminal device uses Dynamic Host Configuration Protocol (DHCP) to acquire a target IP address.

According to the analysis, if the terminal device uses a PPPoE connection to connect to the network, then the method of the present invention determined that the network structure is a first network structure. If the terminal device does not use a PPPoE connection to connect to the network, and the target IP address of the terminal device is a public IP address, and DHCP is used to acquire the target IP address, then the method of the present invention determines that the network structure is a second network structure. If the terminal device does not use a PPPoE connection to connect to the network, and the target IP address is a public IP address, and DHCP is not used to acquire the target IP address, then the method of the present invention determines that the network structure is a third network structure. If the terminal device does not use a PPPoE connection to connect to the network, and the target IP address is not a public IP address, and DHCP is used to acquire the target IP address, then the method of the present invention determine that the network structure is a fourth network structure. If the terminal device does not use a PPPoE connection to connect to the network, and the target IP address is not a public IP address, and DHCP is not used to acquire the target IP address, then the method of the present invention determine that the network structure is a fifth network structure. After the determination of the network structure, the terminal device can automatically set up the network device accordingly.

According to the description of the preferred embodiments of the present invention, the aforementioned network device can be a network camera or a network video server.

According to the description of the preferred embodiments of the present invention, the aforementioned data set can be an ADSL modem or a cable modem.

According to the description of the preferred embodiments of the present invention, the aforementioned sharing device can be a hub, a switch or an IP router.

According to the description of the preferred embodiments of the present invention, the aforementioned terminal device can be a personal computer.

According to the description of the preferred embodiments of the present invention, after the software programs determine the corresponding network structure, then the network device is set up according to the different network structures. In circumstances where it is determined that the network structure is the first network structure, the second network structure or the fourth network structure, then the terminal device sets up the network device to connect to the network system using the corresponding network structure. In circumstances where it is determined that the network structure is the third network structure or the fifth network structure, then the network configuration of the terminal device is taken as the basis, and a set of target network configurations are derived. The target network configurations comprise an unused IP address, and the software programs set up the target network configuration in the network device. Moreover, according to situation requirements, the software programs set up the network device for corresponding DDNS and port forwarding functionality.

In conclusion, the present invention provides methods for analyzing a network environment and setting up of a network device, and it uses a terminal device that has already been successfully connected to a network to actively analyze the network environment where a network device is located, and this invention offers a choice of five types of corresponding network structures, thereby enabling the network device to be automatically set up according to the five different types of network structures.

The present invention overcomes the shortcomings of the prior art and eliminates the need for a user to set up network parameters himself. The installation procedure is extremely easy to implement for general users lacking the background knowledge of networks, and enables the user to easily install a network camera.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
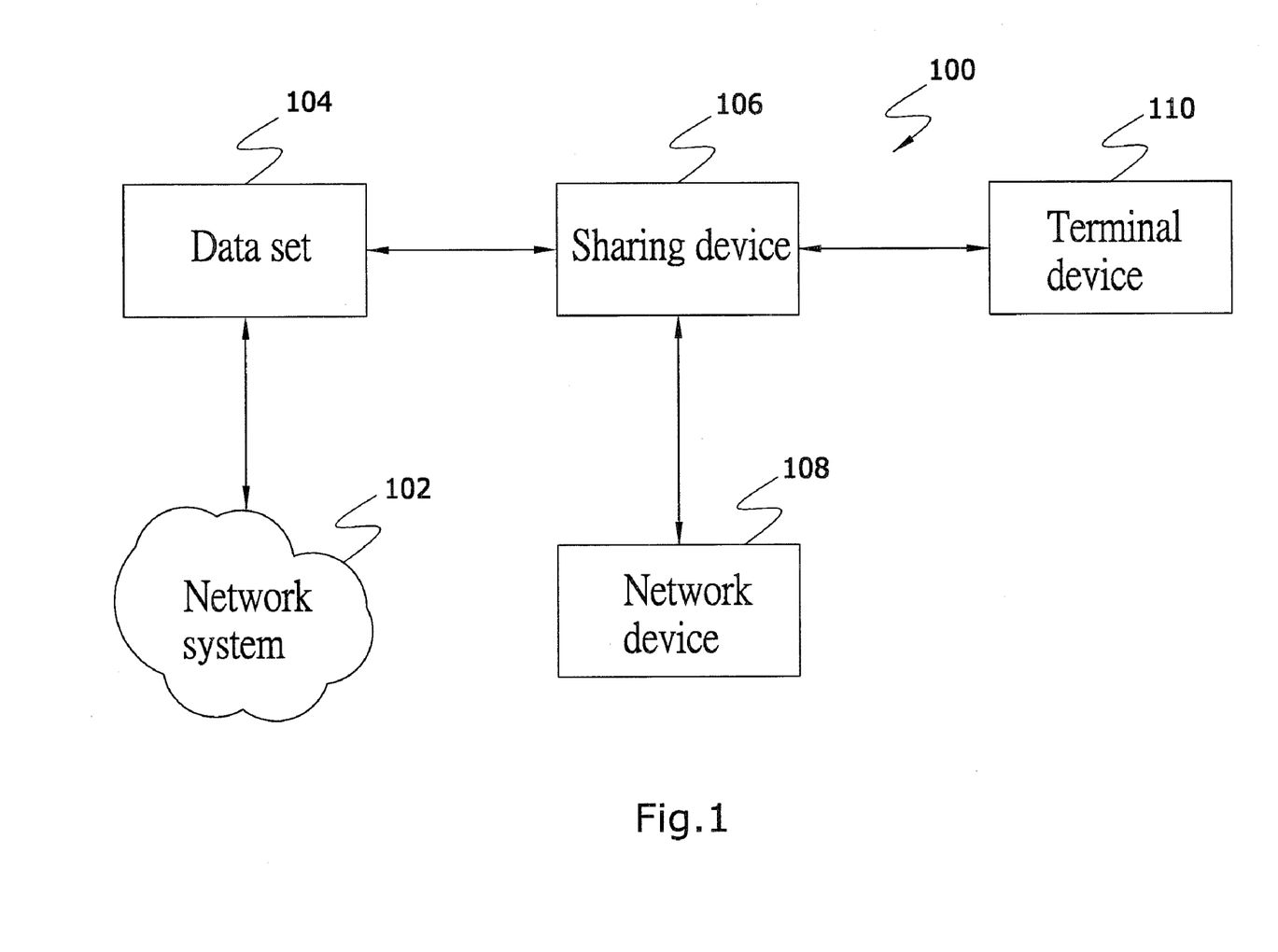
FIG. 1 shows a schematic view depicting a typical network infrastructure for network analysis of a preferred embodiment according to the present invention.

Referring to FIG. 1, which shows a schematic view depicting a typical network infrastructure of a preferred embodiment according to the present invention, wherein a typical network infrastructure 100 comprises a network system 102, a data set 104, a sharing device 106, a network device 108 and a terminal device 110. The data set 104 is coupled to the network system 102, while the sharing device 106 is coupled to the data set 104, the network device 108 and the terminal device 110. In the embodiment, the data set 104 is an Asymmetric Digital Subscriber Line (ADSL) modem or a cable modem. The network device is a network camera or a network video server. The sharing device is a hub, a switch or an IP router. It is worth mentioning that the data set 104 and the sharing device 106 can be each an independent device or combine to be a single device comprising a data set function and a sharing device function. The terminal device 110 is provided with a target IP address, and the target IP address is the IP address of the terminal device 110. In order to analyze the network structure, a plurality of connection data of all network cards of the terminal device 110 must be obtained to enable determining whether or not the terminal device 110 is connected to the network system 102 using a PPPoE connection, after which it is determined whether or not the target IP address of the terminal device 110 is a public IP address, and then it is determined whether or not the terminal device 110 uses DHCP (Dynamic Host Configuration Protocol) to acquire the aforementioned target IP address.

Figure 2:
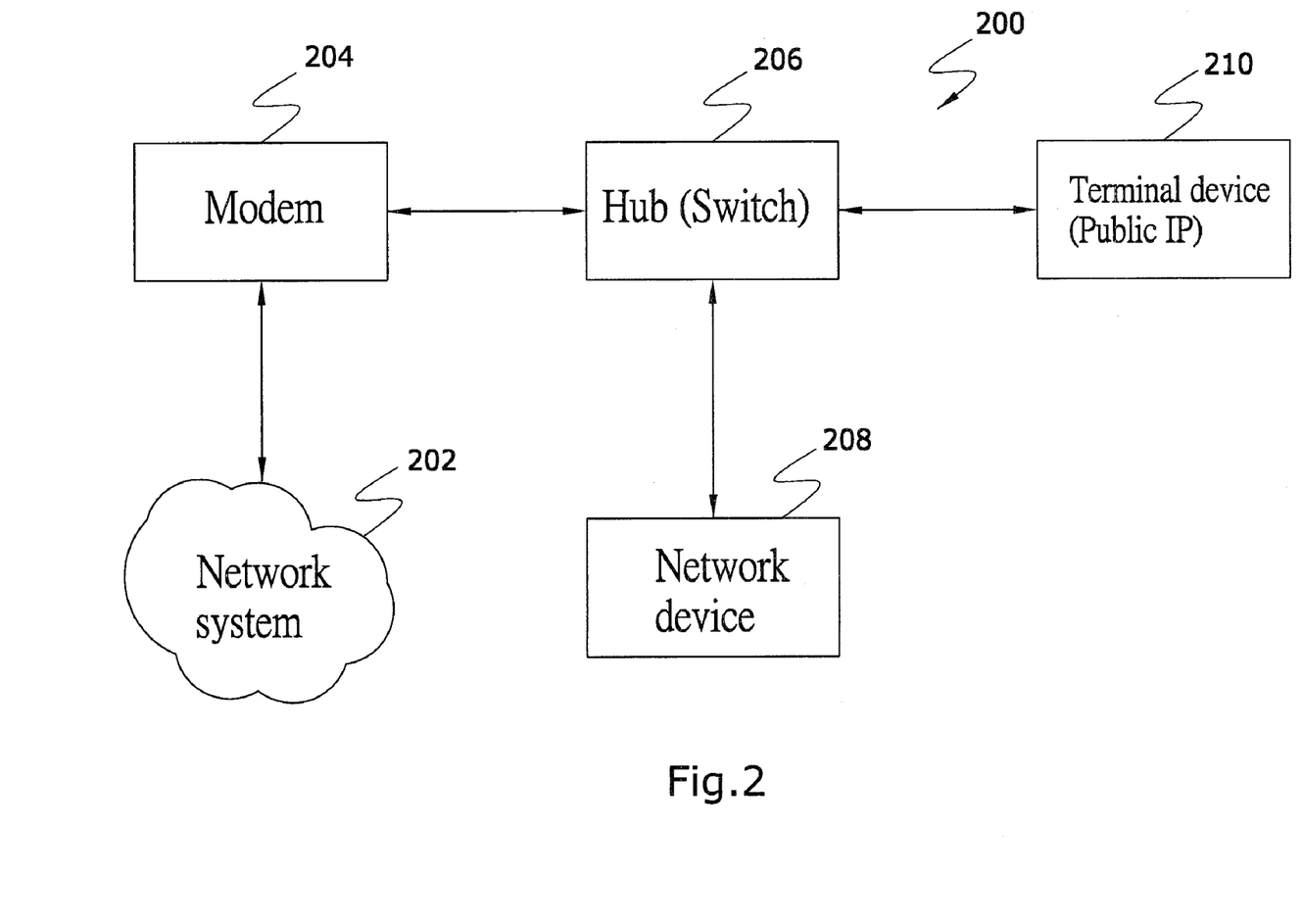
FIG. 2 shows a schematic view depicting a typical network infrastructure of a first network structure of a preferred embodiment according to the present invention.

In order to analyze a network structure, an embodiment of the present invention differentiates the network structure into five situations. Referring to FIG. 2, which shows a schematic view depicting a typical network environment of a first network structure of a preferred embodiment according to the present invention, wherein a typical network environment of a first network structure 200 comprises a network system 202, a modem 204, a hub (or switch) 206, a network device 208 and a terminal device 210. The hub (or switch) 206 is coupled to the modem 204, the network device 208 and the terminal device 210. The terminal device 210 is connected to the network system 202 using a PPPoE connection via the modem 204, enabling the terminal device 210 to acquire a target IP address, and the target IP address is a public IP address. Moreover, the terminal device 210 is provided with a PPPoE interface and a local area network interface.

Figure 3:
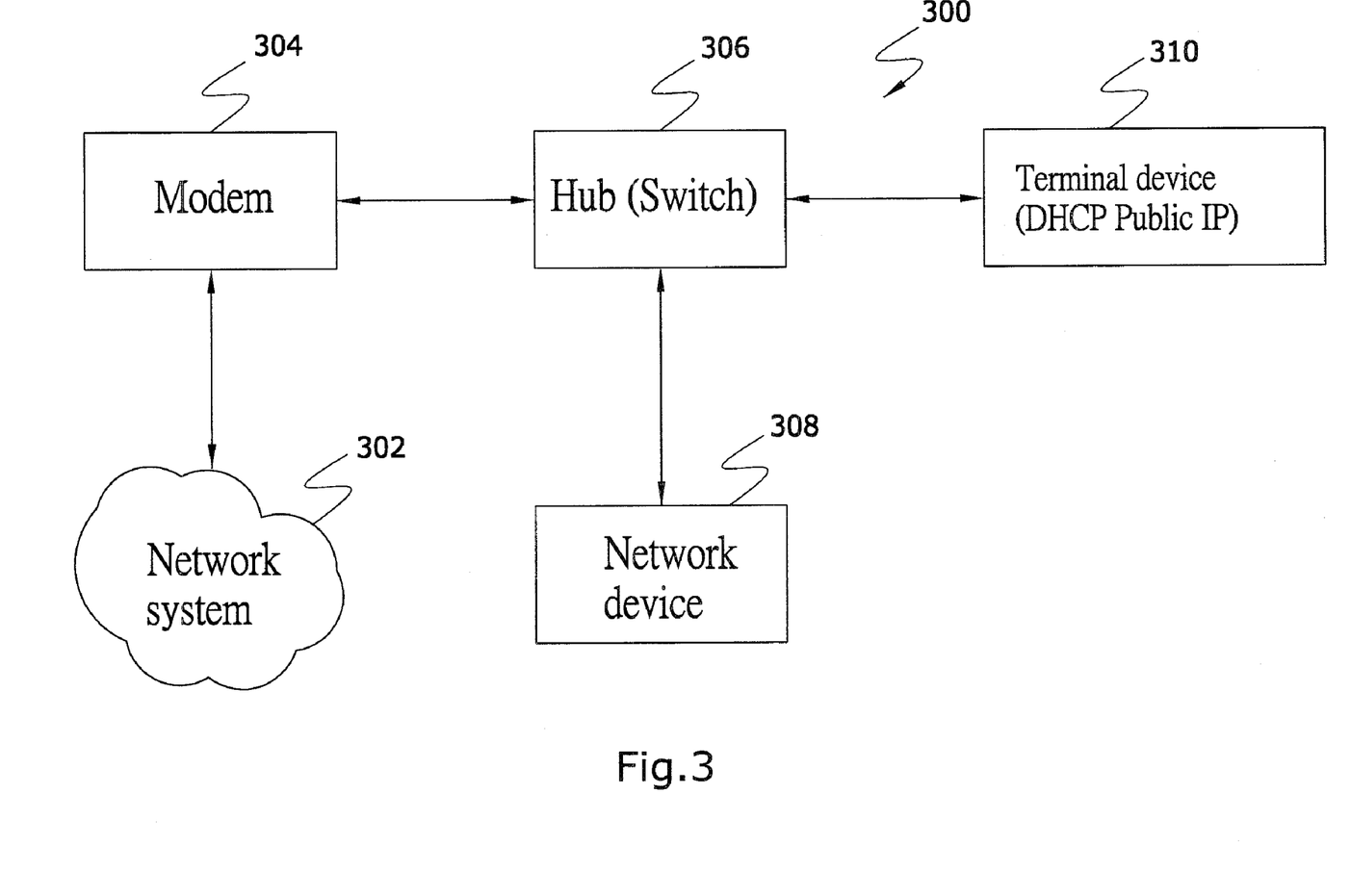
FIG. 3 shows a schematic view depicting a typical network infrastructure of a second network structure of a preferred embodiment according to the present invention.

Referring to FIG. 3, which shows a schematic view depicting a typical network environment of a second network structure of a preferred embodiment according to the present invention, wherein a typical network environment of a second network structure 300 comprises a network system 302, a modem 304, a hub (or switch) 306, a network device 308 and a terminal device 310. The hub (or switch) 306 is coupled to the modem 304, the network device 308 and the terminal device 310. The terminal device 310 acquires a public IP address using DHCP via the modem 304 in order to connect to the network system 302 and the target IP address is a public IP address.

Figure 4:
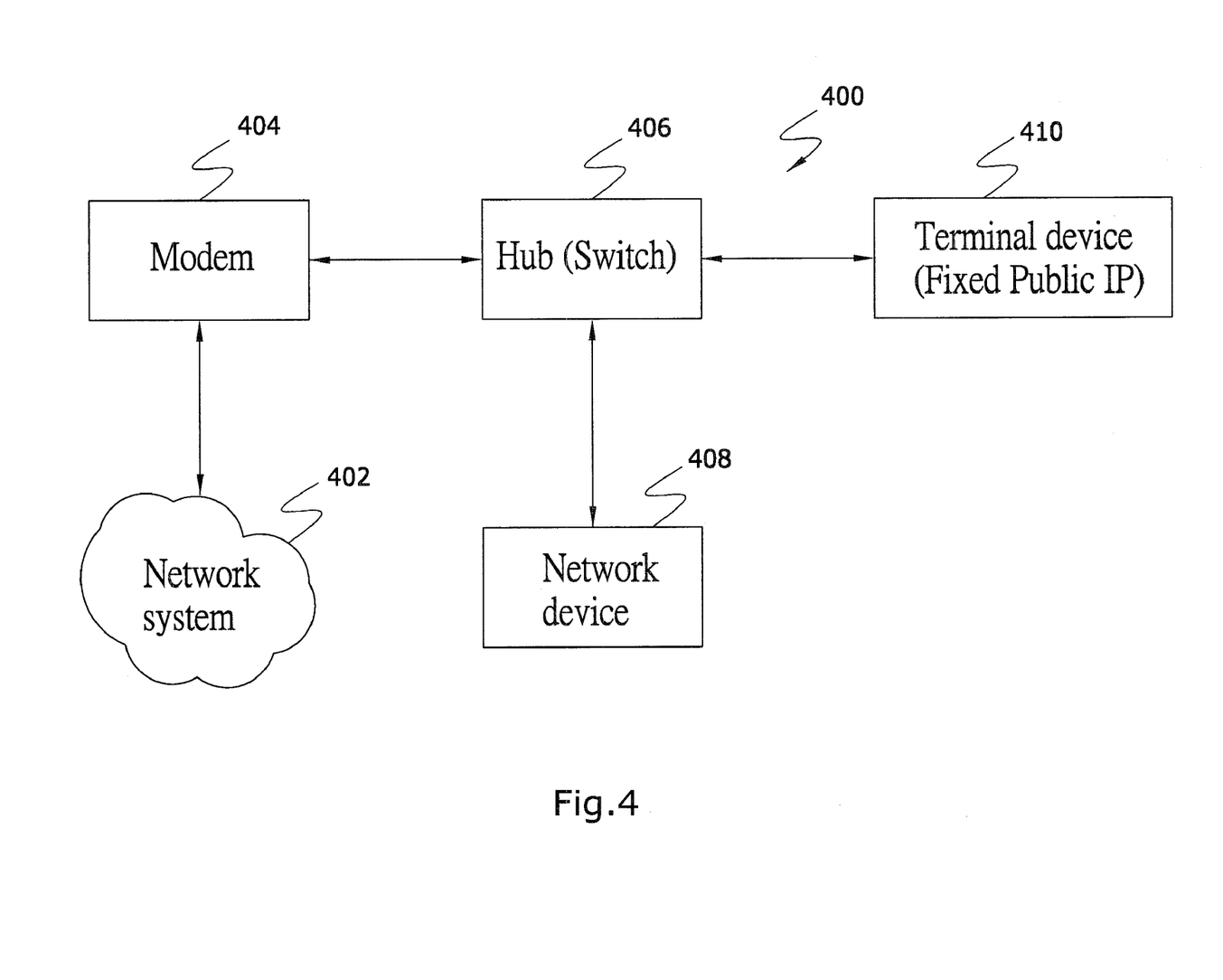
FIG. 4 shows a schematic view depicting a typical network infrastructure of a third network structure of a preferred embodiment according to the present invention.

Referring to FIG. 4, which shows a schematic view depicting a typical network environment of a third network structure of a preferred embodiment according to the present invention, wherein a typical network environment of a third network structure 400 comprises a network system 402, a modem 404, a hub (or switch) 406, a network device 408 and a terminal device 410. The hub (or switch) 406 is coupled to the modem 404, the network device 408 and the terminal device 410. The terminal device 410 is connected to the network system 402 using a fixed public IP address. The target IP address is the aforementioned fixed public IP address.

Figure 5:
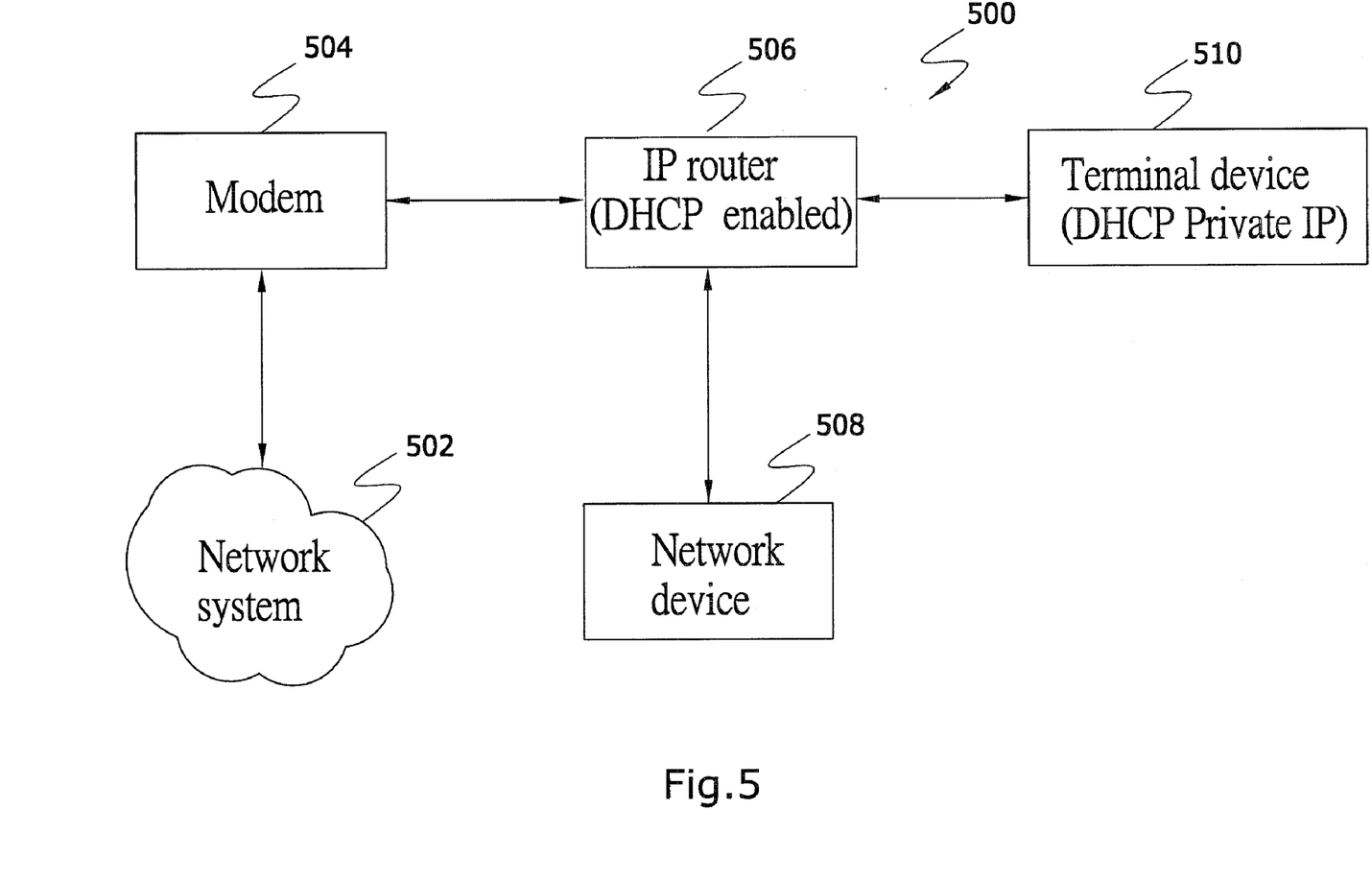
FIG. 5 shows a schematic view depicting a typical network infrastructure of a fourth network structure of a preferred embodiment according to the present invention.

Referring to FIG. 5, which shows a schematic view depicting a typical network environment of a fourth network structure of a preferred embodiment according to the present invention, wherein a typical network environment of a fourth network structure 500 comprises a network system 502, a modem 504, an IP router 506, a network device 508 and a terminal device 510. The IP router 506 is coupled to the modem 504, the network device 508 and the terminal device 510. The IP router 506 is a sharing device, and the IP router 506 enables DHCP. The terminal device 510 acquires a first LAN IP address using DHCP. The target IP address is the aforementioned first LAN IP address. The network device 508 acquires a second LAN IP address using DHCP. The IP router 506 is able to connect to the network system 502 via the modem 504.

Figure 6:
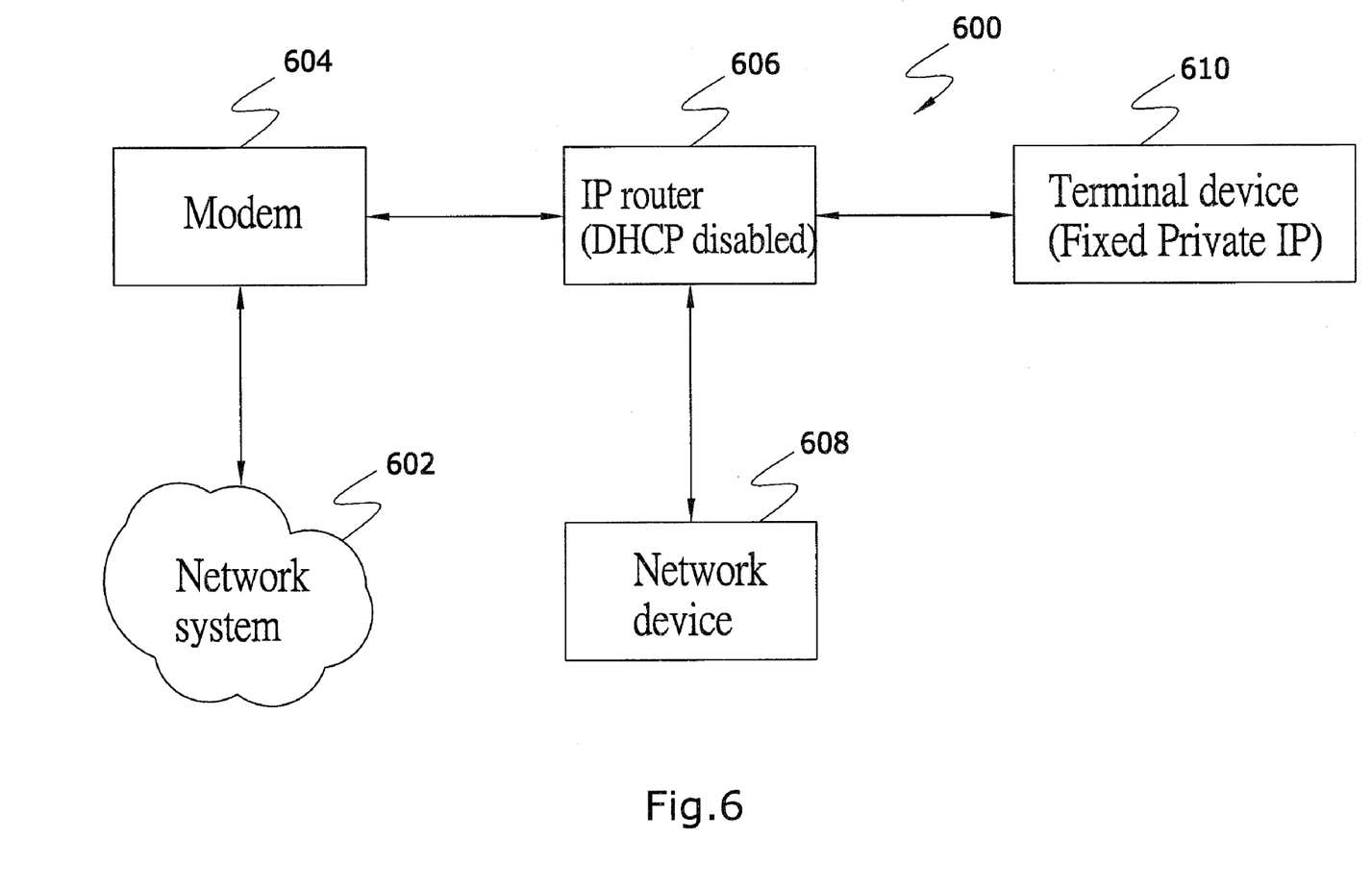
FIG. 6 shows a schematic view depicting a typical network infrastructure of a fifth network structure of a preferred embodiment according to the present invention.

Referring to FIG. 6, which shows a schematic view depicting a typical network environment of a fifth network structure of a preferred embodiment according to the present invention, wherein a typical network environment of a fifth network structure 600 comprises a network system 602, a modem 604, an IP router 606, a network device 608 and a terminal device 610. The IP router 606 is coupled to the modem 604, the terminal device 610 and the network device 608. The IP router 606 is a sharing device, and the IP router 606 is DHCP disabled. Under certain circumstances, because the IP router 606 is DHCP disabled, thus, the terminal device 610 fails to acquire the first LAN IP address, thus, the user himself assigns a LAN IP address, and only then can the terminal device 610 connect to the network system 602. The aforementioned LAN IP address and the IP router 606 belong to the same network domain, and the IP router 606 connects to the network system 602 via the modem 604. Moreover, the target IP address is the aforementioned assigned LAN IP address.

Figure 7:
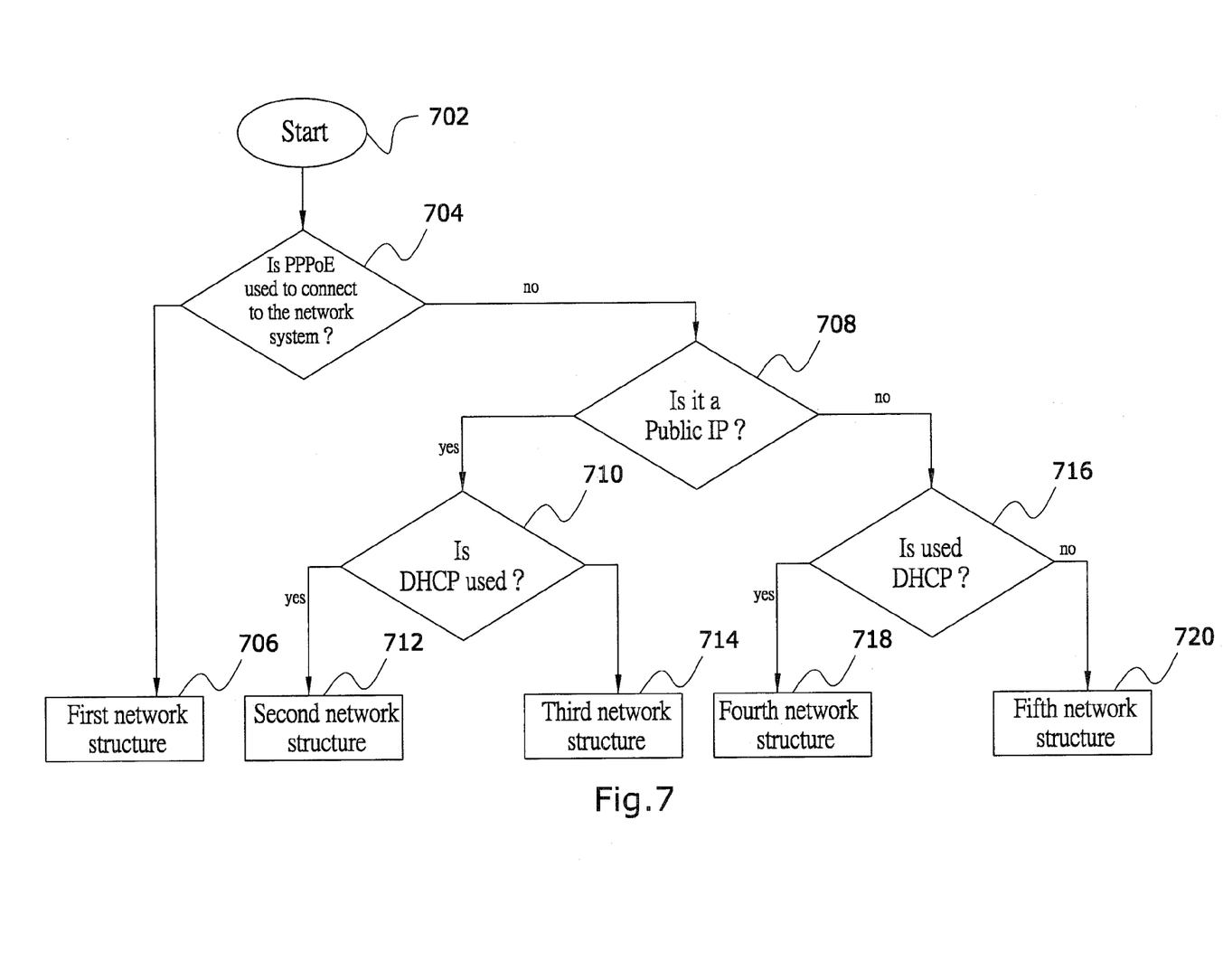
FIG. 7 shows a flow chart depicting a preferred embodiment of a method for analyzing a network environment according to the present invention.

Referring to FIG. 7, a flow chart depicts a preferred embodiment of a method for analysis of a network environment according to the present invention, wherein, in conjunction with FIG. 1, the method for analysis of a network environment is suitable for installing a network device, in which a terminal device executes software programs to implement the method of the present invention.

The method of the present invention comprises the following steps: A terminal device executes a first analysis procedure to determine whether or not the terminal device is connected to a network using a PPPoE connection (704). If the terminal device is connected to the network using a PPPoE connection, then the method of the present invention determines that the network structure is the first network structure (706).

If no, the terminal device executes a second analysis procedure to determine whether or not the target IP address of the terminal device is a public IP address (708). If the target IP address is a public IP address, then the terminal device executes a third analysis procedure to determine whether or not the terminal device uses DHCP to acquire the target IP address (710). Subsequently, if the terminal device is not connected to the network using PPPoE, the target IP address is a public IP address, and the terminal device uses DHCP to acquire the target IP address, then the method of the present invention determines that the network structure is the second network structure (712).

If the terminal device is not connected to the network using PPPoE, the target IP address is a public IP address, and the terminal device does not use DHCP to acquire the target IP address, then the method of the present invention determines that the network structure is the third network structure (714).

Similar to the above, if the target IP address is not a public IP address, then the terminal device still executes the third analysis procedure to determine whether or not the terminal device uses DHCP to acquire the target IP address (716). If the terminal device does is not connected to the network using PPPoE, the target IP address is not a public IP address, and the terminal device uses DHCP to acquire a target IP address, then the method of the present invention determines that the network structure is the fourth network structure (718). If the terminal device is not connected to the network using PPPoE, the target IP address is not a public IP address, and the terminal device does not use DHCP to acquire the target IP address, then the method of the present invention determines that the network structure is the fifth network structure (720).

Figure 8:
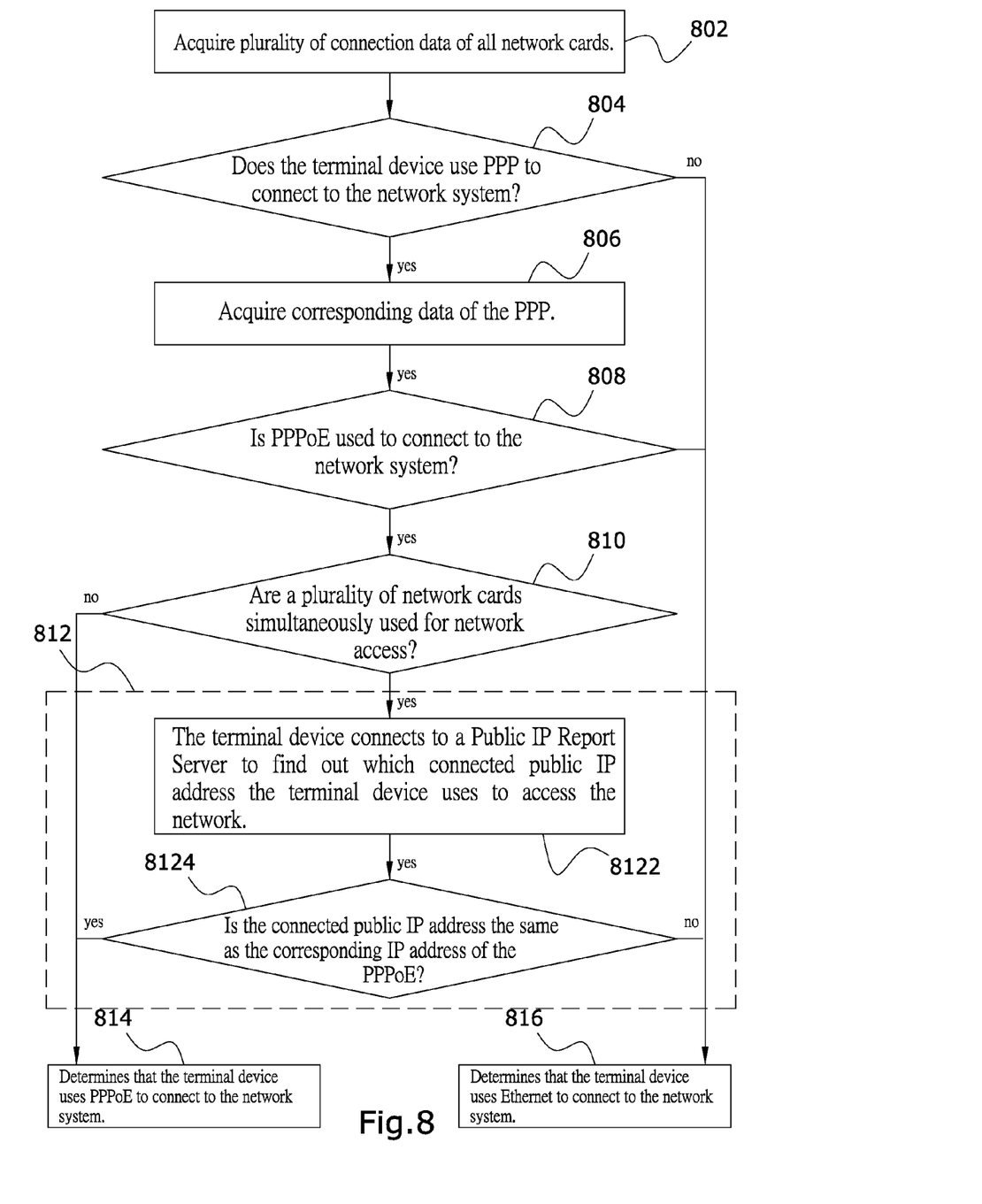
FIG. 8 shows a flow chart depicting a preferred embodiment of a first analysis procedure according to the present invention.

Referring to FIG. 8, which shows a flow chart depicting the first analysis procedure of a preferred embodiment according to the present invention, wherein the first analysis procedure comprises the following steps:

(1) The terminal device executes a first decision procedure to acquire a plurality of connection data of all network cards (802) to determine whether or not the terminal device uses Point to Point Protocol (PPP) to connect to the network system (804);

(2) If it is determined that the terminal device uses PPP to connect to the network system, then the terminal device executes a second decision procedure to acquire corresponding data of the PPP (806) to accurately determine whether or not PPPoE is used to connect to the network system (808).

Under the Microsoft operating system, a plurality of different Windows APIs (Application Programming Interfaces) can be called to execute the aforementioned first decision procedure and the second decision procedure. Moreover, if it is determined that the terminal device does not use PPP to connect to the network system, then it is determined that the terminal device uses Ethernet to connect to the network system. Furthermore, if the method of the present invention determines that the terminal device does not use a PPPoE connection to connect to the network system, then it is determined that the terminal device uses an Ethernet connection to connect to the network system.

If the terminal device simultaneously uses a PPPoE connection and an Ethernet connection, then it represents that the terminal device simultaneously uses a plurality of network cards. Hence, the method of the present invention must determine which of the network cards the terminal device uses to access the network (810), for that, the terminal device executes a third decision procedure (812). The third decision procedure comprises the following steps:

(1) The terminal device connects to a Public IP Report Server to find out which connected public IP address the terminal device uses to access the network (8122);

(2) The method of the present invention determines whether or not the connected public IP address is different from the corresponding IP address of the PPPoE (8124).

According to the above, if the connected public IP address and the corresponding IP address of the PPPoE connection are the same, then the third decision procedure determines that the terminal device uses a PPPoE connection to connect to the network system (814). If the connected public IP address and the corresponding IP address of the PPPoE connection are different, then the third decision procedure determines that the terminal device uses an Ethernet connection to connect to the network system (816).

Figure 9:
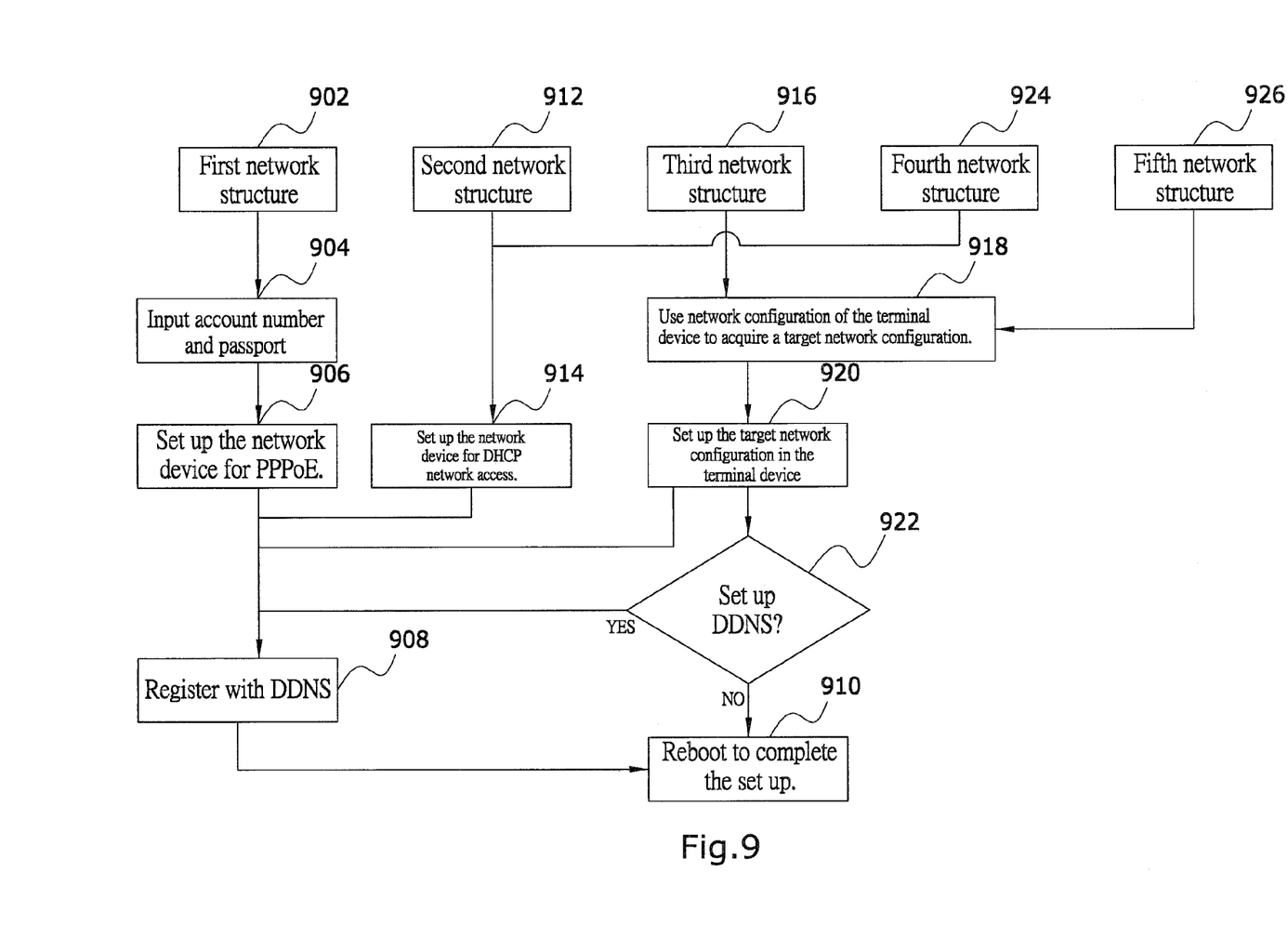
FIG. 9 shows a flow chart depicting another preferred embodiment of a method for analyzing a network environment according to the present invention.

Referring to FIG. 9, which shows a flow chart depicting a preferred embodiment of a method for analysis of a network environment according to the present invention, wherein, in conjunction with FIG. 7, the method for analysis of a network environment comprises the following steps: Using the method for analysis of a network structure of FIG. 7, if the corresponding network is the first network structure (902), then the terminal device requests that the user input an account number and password for the PPPoE connection, and the account number and password are transmitted to the network device (904). The network device is set up to connect to the network system using a PPPoE connection (906), after which the terminal device requests that the user inputs Dynamic Domain Name Service (DDNS) registration data, and the registration data is then registered with a DDNS server (908). The network device then reboots to complete the set up (910).

If the corresponding network is the second network structure (912), then the method of the present invention sets up the network device to connect to the network system using DHCP (914). The terminal device requests that the user inputs DDNS registration data, and the registration data is registered with a DDNS server (908). The network device then reboots to complete the set up (910).

If the corresponding network is the third network structure (916), then the network configuration of the terminal device is taken as the basis, and a new target network configuration is derived from it. The new target network configuration and the network configuration of the terminal device belong to the same network domain, wherein the target network configuration comprises an unused public IP address (918). Subsequently, the target network configuration is set up in the network device (920), after which the terminal device asks whether or not the user wants to set up DDNS (922). If the user wants to set up a DDNS, then the terminal device requests that the user inputs DDNS registration data, and the registration data is registered with the DDNS server (908), then the network device reboots to complete the set up (910). If the user does not need to set up a DDNS, then the network device reboots to complete the set up (910).

If the corresponding network is the fourth network structure (924), then the method of the present invention sets up the network device to connect to the network system using DHCP (914), after which, the terminal device requests that the user inputs DDNS registration data, and the registration data is registered with the DDNS server (908), then the network device reboots to complete the set up (910).

If the corresponding network is the fifth network structure (926), then the network configuration of the terminal device is taken as the basis, and a new target network configuration is derived. The new target network configuration and the network configuration of the terminal device belong to the same network domain, wherein the target network configuration comprises an unused public IP address (918). Subsequently, the target network configuration is set up in the network device (920), after which the terminal device requests that the user inputs DDNS registration data, and the registration data is registered with the DDNS server (908), then the network device reboots to complete the set up (910).

Figure 10:
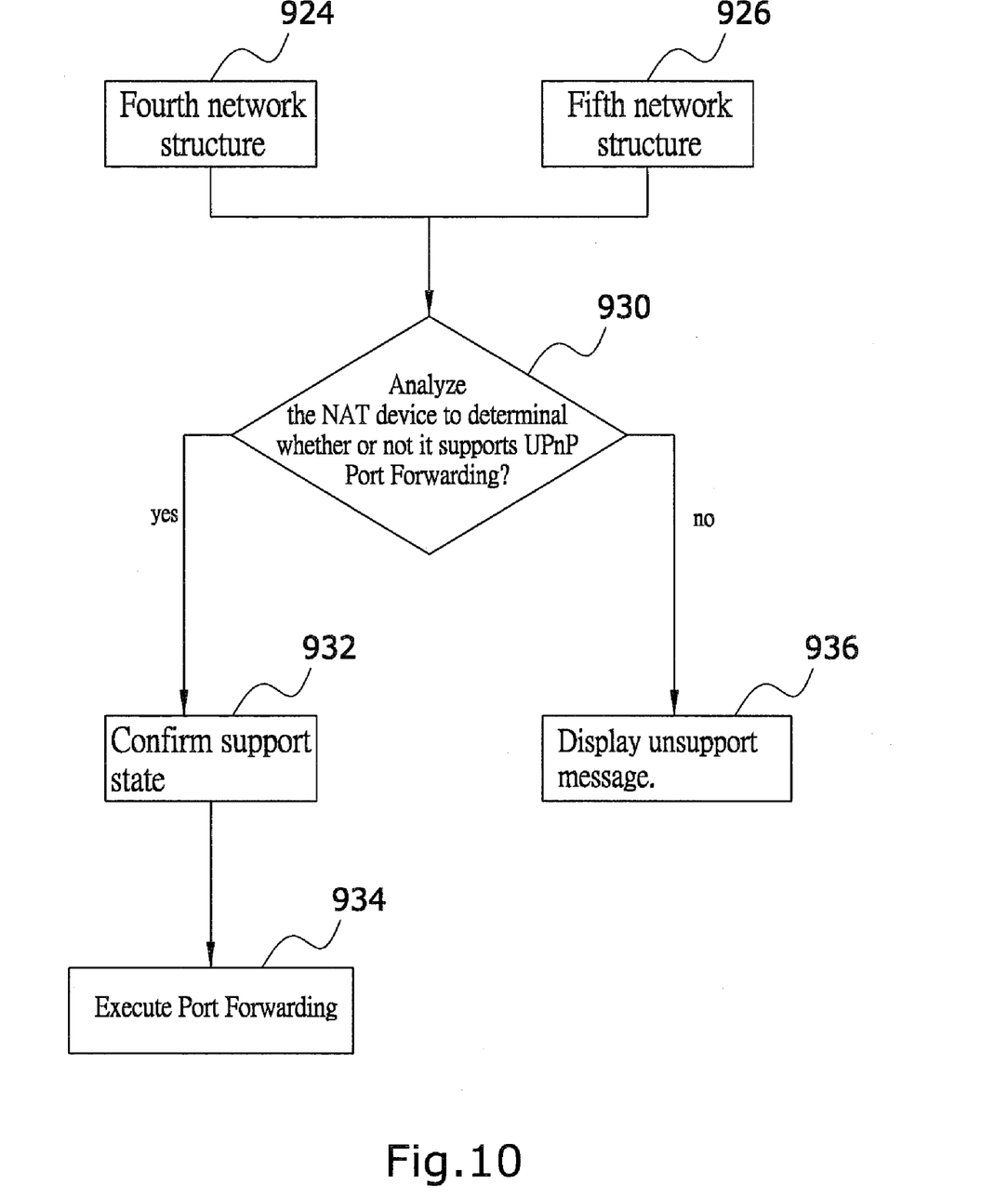
FIG. 10 shows a flow chart depicting another preferred embodiment of a method for analyzing a network environment according to the present invention.

Referring to FIG. 10, which shows a flow chart depicting another preferred embodiment of a method for analysis of a network environment according to the present invention, wherein, in conjunction with FIG. 7, a method for analysis of a network environment comprises the following steps:

(1) In the event the network environment is determined to be the fourth network structure (924) or the fifth network structure (926), since the network device is installed after a device with NAT function, thus, a port forwarding function must be executed to enable user to access the network device from external network;

(2) If the corresponding network is the fourth network structure (924) or the fifth network structure (926), then the terminal device analyzes the NAT device to determine whether or not it supports a Universal Plug and Play (UPnP) port forwarding function (930);

(3) If the NAT device supports the function, then a support state (932) is confirmed, after which the UPnP port forwarding function is executed (934). If the NAT device does not support the function, then the terminal device displays a message that the NAT device does not support the UPnP port forwarding function (936).

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A method for analyzing a network environment, suitable for installation of a network device, comprising the following steps:

executing a first analysis procedure by a terminal device, to determine whether or not a PPPoE connection is used to connect to a network;

executing a second analysis procedure by the terminal device, to determine whether or not a target IP address is a public IP address; and executing a third analysis procedure by the terminal device, to determine whether or not DHCP is used to acquire a target IP address; wherein, if the PPPoE connection is used to connect to the network, then it is determined that the network is a first network structure;

if the PPPoE connection is not used to connect to the network, and the target IP address is a public IP address, and the DHCP is used to acquire the target IP address, then it is determined that the network is a second network structure;

if the PPPoE connection is not used to connect to the network, and the target IP address is a public IP address, and the DHCP is not used to acquire the target IP address, then it is determined that the network is a third network structure;

if the PPPoE connection is not used to connect to the network, and the target IP address is not a public IP address, and the DHCP is used to acquire the target IP address, then it is determined that the network is a fourth network structure; and, if the PPPoE connection is not used to connect to the network, and the target IP address is not a public IP address, and the DHCP is not used to acquire the target IP address, then it is determined that the network is a fifth network structure.

2. The method for analyzing a network environment according to claim 1, wherein said network device is either a network camera or a network video server.

3. The method for analyzing a network environment according to claim 1, wherein said first analysis procedure comprises the following steps:

executing a first decision procedure, to acquire a plurality of connection data of at least one network card to determine whether or not PPP is used to connect to the network system;

executing a second decision procedure, to acquire corresponding data of the PPP to determine whether or not PPPoE is used to connect to the network system.

4. The method for analyzing a network environment according to claim 3, wherein if said terminal device simultaneously uses multiple network cards, then the terminal device executes a third decision procedure comprising the following steps:

connecting to a public IP report server, to acquire a connected public IP address; and, if the connected IP address and the corresponding public IP address of the PPPoE connection are the same, determining that the terminal device uses the PPPoE connection to connect to the network system.

5. The method for analyzing a network environment according to claim 4, wherein, if the connected IP address and the corresponding public IP address of the PPPoE connection are different, determining that the terminal device uses an Ethernet connection to connect to the network system.

6. The method for analyzing a network environment according to claim 1, further comprises the following steps:
if the corresponding network is the first network structure, requesting a user to input an account number and a password for the PPPoE connection;
setting the network device to use the PPPoE connection to connect to the network system; and
transmitting the account number and the password to the network device.

7. The method for analyzing a network environment according to claim 6, further comprises the following steps:
requesting the user to input DDNS registration data; and,
registering the registration data with a DDNS server.

8. The method for analyzing a network environment according to claim 1, further comprises the following steps:
if the corresponding network is the second network structure, setting up the network device to connect to the network system using DHCP.

9. The method for analyzing a network environment according to claim 8, further comprises the following steps:
requesting the user to input DDNS registration data; and,
registering the registration data with a DDNS server.

10. The method for analyzing a network environment according to claim 1, further comprises the following steps:
if the corresponding network is the third network structure, using a network configuration of the terminal device to acquire a target network configuration having the same network domain, in which the target network configuration comprises an unused public IP address; and,
setting up the target network configuration in the network device.

11. The method for analyzing a network environment according to claim 10, further comprises the following steps:
asking the user whether or not to set up DDNS; and,
if DDNS needs to be set up, requesting the user to input DDNS registration data; and
registering the registration data with a DDNS server.

12. The method for analyzing a network environment according to claim 1, further comprises the following steps:
if the corresponding network is the fourth network structure, setting up the network device to connect to the network system using DHCP.

13. The method for analyzing a network environment according to claim 12, further comprises the following steps:
requesting the user to input DDNS registration data; and,
registering the registration data with a DDNS server.

14. The method for analyzing a network environment according to claim 1, further comprises the following steps:
if the corresponding network is the fifth network structure, using a network configuration of the terminal devices to acquire a target network configuration having the same network domain, in which the target network configuration comprises an unused LAN IP address; and,
setting up the target network configuration in the network device.

15. The method for analyzing a network environment according to claim 14, further comprises the following steps:
requesting the user to input DDNS registration data; and,
registering the registration the data with a DDNS server.

16. The method for analyzing a network environment according to claim 1, further comprises the following steps:
if the corresponding network is the fourth network structure, determining whether or not a sharing device connected to the terminal device supports UPnP port forwarding functionality.

17. The method for analyzing a network environment according to claim 16, further comprises the following steps:
if the sharing device supports the UPnP port forwarding function, confirming a support state; and,
executing the UPnP port forwarding function.

18. The method for analyzing a network environment according to claim 16, further comprises the following steps:
if the sharing device does not support the UPnP port forwarding function, displaying an unsupport message.

19. The method for analyzing a network environment according to claim 1, further comprises the following steps:
if the corresponding network is the fifth network structure, determining whether or not a sharing device connected to the terminal device supports UPnP port forwarding functionality.

20. The method for analyzing a network environment according to claim 19, further comprises the following steps:
if the sharing device supports the UPnP port forwarding function, confirming a support state; and,
executing the UPnP port forwarding function.

21. The method for analyzing a network environment according to claim 19, further comprises the following steps:
if the sharing device does not support an UPnP port forwarding function, displaying an unsupport message.

* * * * *